United States Patent [19]

Martin et al.

[11] 3,872,104
[45] Mar. 18, 1975

[54] PROPARGYL ETHERS COMPOSITIONS CONTAINING THEM AND A METHOD OF COMBATING SOIL FUNGI

[75] Inventors: Henry Martin, Basel; Otto Rohr, Therwil, both of Switzerland; Georg Pissiotas, Lorrach, Germany

[73] Assignee: Ciba-Geigy AG, Basel, Switzerland

[22] Filed: June 10, 1974

[21] Appl. No.: 477,875

Related U.S. Application Data

[60] Division of Ser. No. 265,367, June 22, 1972, Pat. No. 3,830,849, which is a continuation-in-part of Ser. No. 89,528, Nov. 13, 1970, abandoned.

[30] Foreign Application Priority Data

Nov. 26, 1969 Switzerland.................... 17574/69

[52] U.S. Cl. ............................................. 424/340
[51] Int. Cl............................................... A01n 9/24
[58] Field of Search........................... 424/340, 150

[56] References Cited
UNITED STATES PATENTS

| | | | |
|---|---|---|---|
| 3,322,813 | 8/1972 | O'Brien et al. | 260/612 D |
| 3,686,331 | 5/1967 | Seki et al. | 260/612 D X |

*Primary Examiner*—Albert T. Meyers
*Assistant Examiner*—Douglas W. Robinson
*Attorney, Agent, or Firm*—Frederick H. Rabin

[57] ABSTRACT

Halogeno-alkylphenylpropargyl ether of the formula

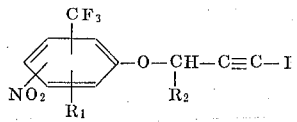

are disclosed in which $R_1$ is hydrogen or chlorine and $R_2$ hydrogen or methyl. These compounds are suitable as active ingredient for combating soil fungi.

2 Claims, No Drawings

PROPARGYL ETHERS COMPOSITIONS CONTAINING THEM AND A METHOD OF COMBATING SOIL FUNGI

CROSS REFERENCE

This is a division of application Ser. No. 265,367, filed on June 22, 1972 now U.S. Pat. No. 3,830,849, is a continuation-in-part of application Ser. No. 89,528, filed on Nov. 13, 1970, now abandoned.

This invention provides new iodo-trifluormethyl phenylpropargyl ethers of the formula

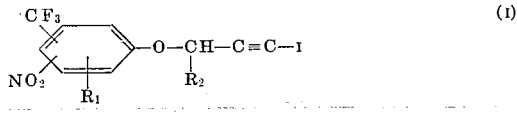

in which $R_1$ is hydrogen or chlorine and $R_2$ hydrogen or methyl. An especially preferred embodiment are those compounds in which one of the groups $CF_3$ and $NO_2$ is in ortho whereas the other is in para position. Accordingly the following compounds are examples of suitable representatives of the formula (1):

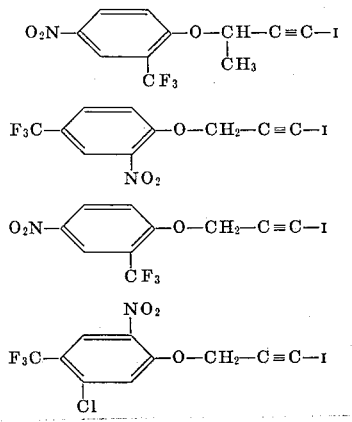

The compounds of general formula I can be prepared by known methods, for example by reacting an aromatic radical of the formula

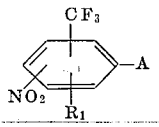

in which A represents a halogen atom or a hydroxyl group and $R_1$ has the meaning given above with propargyl alcohol or a proparqvl halide, and subsequently iodizing the phenylpropargyl ether so formed.

The compounds of the formula I are useful for the control of soil fungi; that is those fungi that tend to attack plants from the soil and cause, for example, root decay, pathological changes in the stalk cortex, reduction in seedling growth, decomposition of seeds and, in some cases, tracheomycosis. Examples of such fungi are various species of each of the genera *Alteneria, Aphonomyles Botrytis, Cercosporella, Fusarium, Helmithosporium, Olpidium, Ophicholus, Phoma, Phvtophthora, Pythium, Rhizoctonia, Sclerotinia, Sclerotium, Thielavia, Thielaviopsis* and *Verticillium*.

The compounds of formula I can be used alone or together with one or more other active substances (as hereinafter defined). In many cases, a mixture of compounds broadens the spectrum of activity, although in a very large number of cases a true synergistic effect is obtained.

The term "active substance" is used herein to mean a substance which is useful for the control of fungi.

The following substances are given as examples of active substances that can be used in admixture or conjunction with the compounds of general formula I:

Inorganic substances

Elemental sulphur, ammonium polysulphide, sodium polysulphide, barium polysulphide, calcium polysulphide and calcium thiosulphate (line sulphur), calcium hypochlorite, boric acid, sodium tetraboratedecahydrate (borax), zinc chloride, magnesium borate, nickel sulphate, potassium chromate, lead arsenate, cadmium chloride, and cadmium carbonate;

Copper substances copper (I) oxide (cuprous oxide), Bordeaux mixture, copper (II) sulphate-pentahydrate (copper sulphate), basic copper (II) chloride (copper oxychloride), copper (II) phosphate, tribasic copper (II) sulphate (tribasic copper sulphate), basic copper (II) carbonate, copper (II) dihydrazine sulphate, a copper-amine complex, copper, (II) sulphate/ammonium carbonate mixture, copper (II) chloride/basic copper (II) sulphate mixture, basic copper (II) carbonate/zinc salt mixture, copper (II)-zinc chromate complex (copper zinc chromate), copper (II)-zinc-cadmium-calcium chromate complex, copper (II) salt of oleic acid (copper oleate), a copper (II) salt of a fatty acid, copper (II) salt of naphtenic acid (copper naphthenate, copper (II) salt of 8-hydroxyquinoline (oxine copper), copper (II) salt of 1,2-naphthoquinoneoxime- (2), and copper (II) salt of 3-phenylsalicylate;

Tin and mercury substances bis-(trin-n-butyl tin)oxide, triphenyl tin hydroxide (fentin hydroxide), triphenyl tin acetate (fentin acetate), bis-(tributyl tin)succinate, mercury(I) chloride (calomel), mercury(II) chloride (mercuric chloride), mercury (II) oxide, mercury-zinc chromate complex, mercury(II) laqtate, ethylmercury chloride, 2hydroxyethyl mercury acetate, ethylmercury isothiocyanate, 3-ethoxypropyl mercury bromide, chloromethoxypropyl mercury acetate, methoxyethyl mercury chloride, 2-methoxyethyl mercury silicate, bis-(methylmercury) sulphate, bis-(methylmercury) ammonium acetate, ethylmercury acetate, 2-methoxyethylmercury acetate, ethylmercury phosphate, isopropylmethylmercury acetate, methylmercury cyanide, methylmercury benzoate, N-cyano-N'(methylmercury) guanidine, methylmercury pentachlorophenolate, ethylmercury-2,3-dihydroxypropyl mercaptide, methylmercury-8hydroxyquinolate (Ortho LM), N-methylmercury)-1,4,5,6,7,7-hexachlorobicyclo[2,2,1]hept-5-ene-2,3-dicarboximide, N-(ethylmercury)-1,4,5,6,7,7-hexachlorobicyclo[2,2,1]hept-5-ene-2,3-dicarboximide, sodium salt of ethylmercury thiosalicylate, N-(ethylmercury)-para-toluenesulphonic acid anilide, phenylmercury acetate (PAM), phenylmercury propionate, phenylmercury triethanolammonium lactate (PAS), phenylmercury urea, N-(phenylmercury)-1,4,5,6,7,7-hexachlorobicyclo[2,2,1]hept-5-ene-2,3-dicarboximide, phenylmercury dimethyldithiocarbamate, phenylmercury formamide, phenylmercury chloride, phenylmercury acetate, phenylmercury benzoate, phenylmercury borate, phenylmercury hydroxide, phenylmercury iodide, basic phenylmercury nitrate, phenylmercury monoethyanolamine lactate, phenylmercury salicylate, hydroxymercury chlorophenol, hydroxymercury trichlorophenol, hydroxymercury nitrophenol, N-phenylmercury ethylenediamine, phenylmercury monoethanolammonium acetate, pyridylmercury acetate, diphenylmercury-8-hydroxyguinolate, a mercury(II) complex with an organic phosphate, mixture of methylmercury-2,3dihydroxypropylmercaptide and methylmercury acetate, mixture of hydroxymercury chlorophenol and hydroxymercury nitrophenol, and mercury-cadmium organic complex;

Further organic metal compounds
cadmium succinate, cadmium-di-n-propylxanthogenate, cadmium-8-hydroxyquinolate, phenylaminocadmium acetate, phenylaminocadmium dilactate, methylarsine sulphide, zinc octate and zinc oleate;

Simple organic compounds (aliphates)
formalin, paraformaldehyde, acrolein, methyl bromide, methyl isothiocyanate, tetraiodoethylene, 1,3-dichloropropene and related chlorinated $C_3$ hydrocarbons, 1-chloro-3-bromoprene(1), trans-1,4-dibromobutene(2), 1,3-dichloropropene(1), 1-chloro-2-nitropropane, 2-chloro-1-nitropropane trichloronitromethane, dichlorotetrafluoro-acetone, sodium salt of propionic acid, calcium salt of propionic acid, chlorofumaric acid-bis-$\beta$-chloroethyl ester, sorbic acid and the potassium salt thereof, 2-propene-1,1-diolacetate, 2-aminobutane, dodecylguanidine acetate (dodine), dodecylquanidine phthalate, $\alpha$-chloroacetyl-1,3-aminopropionitrile, $\alpha$-bromoacetylvalinamide, 1,2-dichloro-1-(methylsylphonyl) ethylene, 1,2-dichloro-1-(butylsulphonyl)ethylene, and trans-1,2-bis-(n-propylsulphonyl)ethylene;

Benzene derivatives
para-dichlorobenzene, hecta-chlorobenzene (HCB), 1,2,4,5-tetrachloro-4-nitrobenzene (tecnazene), pentachloronitrobenzene (quintozene), 1,3,5-trichloro-2,4,6-trinitrobenzene, isomer mixture of 1,3,4-trichloro-2,6-dinitrobenzene and 1,2,3-trichloro-4,6-dinitrobenzene, 2,4,5,6-tetrachloroisophthalic acid nitrile, 2,4-dinitrophenylthiocyanate, diphenyl, ortho-nitrodiphenyl, 1-chloro-2,4-dinitronaphthalene acenaphthene;

Phenols
2,4,6-trichlorophenol, 2,4,5-trichlorophenol, 2,4,5-trichlorophenyl acetate, 2,4,5-trichlorophenyl chloroacetate, trichlorophenol zinc salt, meta-cresyl acetate, 2,3,4,6tetrachlorophenol, pentachlorophenol (PCP), ortho-dihydroxybenzene, 2,4-dihydroxy-n-hexylbenzene, 2-phenylphenol (ortho-phenylphenol), 3,5-dibromosalicylic aldehyde, 2-benzyl-4-chlorophenol, 2,2′-dihydroxy-5,5′-dichlorodiphenylmethane (dichlorophene), 2,2′-dihydroxy-3,3′,5,5′, 6,6′-hexachlorodiphenylmethane, 2,2′-dihydroxy-5,5′-di-chlorodiphenylsulphide, 2,2′-dihydroxy-3,3′, 5,5′-tetrachlorodiphenylsulphide, 2,2′-dihydroxy-3,3′,5,5′-tetrachlorodiphenylsulphide chlorodiphenylsulphide disodium salt, 4-chloro-ortho-phenylphenol, 1,4-dichloro-2,5-dimethoxybenzene, salicylic anilide, bismuthsalicylate, trifluoromethylsalicylic anilide halogenated with chlorine or bromine, brominated salicylic anilide, and (3,5-dimethyl-4-chlorophenoxyl)-ethanol;

Dinitrophenol derivatives
2-(1-methyl-n-propyl)-4,6-dinitrophenyl-2-methylcrotonate (binapacryl), 2-(1-methyl-n-propyl)-4,6-dinitrophenylisopropylcarbonate (dinobuton), 2-(1-methyl-n-heptyl)-4,6-dinitrophenylcrotonate (dinocap), methyl-2,6-dinitro-4-(1-ethylhexyl)phenylcarbonate + methyl-2,6-dinitro-4-(1-propylphenyl)phenylcarbonate (dinocton p), 4-nonyl-2,6-dinitrophenylbutyrate, and S-methyl-2-(1-methyl-n-heptyl)-4,6-dinitrophenylthiocarbonate;

Aniline derivatives
2,6-dichloro-4-nitroaniline (dichloran), 2-cyanoethyl-N-phenylcarbamate, propynyl-N-phenylcarbamate and $\alpha$-(2-bromoacetoxy)-actanilide;

Quinone derivatives
2,3,5,6-tetrachlorobenzoquinone(1,4) (chloranil), 2,3-dichloronaphthoquinone(1,4) (dichlone), 2-amino-3-chloronaphthoquinone(1,4), 2,3,6,7-tetrachloro-4$a$,8$a$-epoxy-1,2,3,4, 4$a$, 8$a$-hexahydro-1,4-methanonaphthalene-5,8-dione, and quinonoximebenzoylhydrazone (benquinox);

Trichloromethylthio derivatives
N-(trichloromethylthio)phthalimide (folpet), N-(trichloromethylthio)cyclohex-4-ene-1,2-dicarboximide (captan), N-(1,1,2,2-tetrachloroethylthio)cyclohex-4-ene-1,2-dicarboximide (captafol), N-methanesulphonyl-N-trichloromethylthio-para-chloroaniline, N′-dichlorofluoromethylthio-NN-dimethyl-N′-phenylsulphamide (dichlofluanid), and S-(2-pyridyl-1-oxide)-S′-trichloromethyl disulphide; hydrochloride;

Organic phosphates
0,0,0-trimethylthiophosphate, 0,0-diethylphthalimidophosphonothioate, 5-amino-bis-(dimethylamido)phosphinyl-3-phenyl-1,2,4-triazole (triamiphos), 5-methylamino-bis-(dimethylamido)phosphinyl-3-phenyl-1,2,4-triazole, 0,0-diethyl-0-2-pyrazinylphosphorthioate, 0-ethyl-S,S-diphenyldithiolphosphate, 0-ethyl-S-benzylphenyldithiophosphonate, and 0,0-diethyl-S-benzylthiolphosphate;

Dithiocarbamates
zinc salt of dithiocarbazine acid, sodium-N-methyldithiocarbamate (metham), sodium-N-methoxyethyldithiocarbamate, sodium-N,N-dimethyldithiocarbamate (DDC), ammonium-N,N-dimethyldithiocarbamate, zinc-N,N-dimethyldithiocarbamate (ziram), iron-N,N-dimethyldithiocarbamate (ferbam), copper-N,N-dimethyldithiocarbamate, disodium-ethylene-1,2-bis-dithiocarbamate (nabam), zinc-ethylene-1,2-bis-dithiocarbamate (zineb), iron-ethylene-1,2-bis-dithiocarbamate, manganese(II)-ethylene-1,2-bis-dithiocarbamate (maneb), calcium-ethylene-1,2-bis-dithiocarbamate, ammonium-ethylene-1,2-bis-dithiocarbamate, zinc-propylene-1,2-bis-dithiocarbamate (mezineb) (propineb), bis(dimethylthiocarbamyl) ethylene-1,2-bis-dithiocarbamate, complex consisting of (maneb) and zinc salt (mancozeb), tetra-ethylthiuram monosulphide, bis-(N-N-dimethyldithiocarbamy)mercapto)-methylarsine, tetramethylthiuramdisulphide (thiram), dipyrrolidylthiuramdisulphide, N,N′-bis-(dimethylamino)thiuramdisulphide, polyethylenethiuramsulphide, and complex consisting of (zineb) and polyethylenethiuramdisulphide (metiram);

O-Heterocycles bis-(3,4-dichloro-2(5)-furanoyl)ether (mucochloric anhydride), 2-methoxymethyl-5-nitrofuran, 5-nitrofurfuraldoxime-(2), 5-nitrofurfurylamideoxime-(2), and 1-hydroxy-3-acetyl-6-methylcyclohexene-(5)-dione-(2,4) (dehydroacetic acid);

1-N-Heterocycles

3-[2-(3,5-dimethyl-2-hydroxycyclohexyl)-2-hydroxyethyl]-glytarimide (cycloheximide), phthalimide, pyridine-2-thiol-1-oxide or 1-hydroxypyridine-2-thione, zinc salt of pyridine-2-thiol-1-oxide, manganes(I) salt of pyridine-2thiol-1 -oxide, S-1(1-oxido-2-pyridyl)isothiuronium chloride, αα-bis(4-chlorophenyl)-3-pyridinemethanol (parinol), 8-hydroxyquinoline (8-quinolinol), 8-hydroxyquinoline sulphate (quinosol), benzoyl-8-hydroxyquinoline salicylate, 3-(2-methylpiperidino)propyl-3,4-dichlorobenzoate, 6-ethoxy-1,2-dihydro-2,2,4-trimethylquinoline (ethoxyquin), N-lauryl-isoquinolinium bromide, 9-(para-n-hexyloyphenyl)-10-methylacridinium chloride, and 9-(para-n-hexyloxyphenyl)-10-methylacridinium-para-toluene sulphonate;

2- and 3-N-heterocycles 2-n-heptadecylimidazolidine acetate (glyodine), 1-hydroxyethyl-2-heptadecylimidazolidine, 1-phenyl-3,5-dimethyl-4-nitrosopyrazole, 1-para-chlorophenyl-3,5-dimethyl-4-nitrosopyrazole, 1-para-sulphamylphenyl-3,5-dimethyl-4-nitrosopyrazole, N-(1-phenyl-2-nitropropyl)piperazine, 2-dimethylamino-6-methyl-5-n-butyl-4-hydroxypyrimidine, N-dodecyl-1,4,5,6-tetrahydropyrimidine, N-dodecyl-2-methyl-1,4,5,6-tetrahydropyrimidine, 2-n-heptadecyltetrahydropyrimidine, 1-(4-amino-4-propyl-5-pyrimidylmethyl)-2-methylpyridinium chloride hydrochloride, 2-(2'-furyl)-benzimidazole (furidazole), 3-dodecyl-1-methyl-2-phenylbenzimidazolium ferricyanide, methyl-N-benzimidazol-2-yl-N-(butylcarbamoyl)carbamate (benomyl), 2-(ortho-chloroanilino)-4,6-dichloro-sym.-triazine, and 2-ethylamino-6-methyl-5-n-butyl-4-hydroxypyrimidine;

S-Heterocycles 5-chloro-4-phenyl-1,2-dithiol-3-one, 2,3-dicyano-1,4-dithia-anthraquinone (dithianone), and 2-(4-thiazolyl)-benzimidazole;

NO-, NS- and OS-heterocycles 4-(2-chlorophenylhydrazono)-3-methyl-5-isoxazolone (drazoxolone), thiazolidinone-4-thione-(2) (rhodanine), 3-(parachlorophenyl)-5-methylrhodanine, 3,-5-dimethyltetrahydro-1,3,5-thiadiazine-2-thione (dazomet), 3,3'-ethylene-bis-(tetrahydro-4,6-dimethyl)-2H-1,3,5-thiadiazine-2-thione) (milneb), 3-benzylidene-amino-4-phenylthiazoline-2-thione, 6-chlorobenzthiazole-2-thiol zinc salt, 6-β-diethylaminoethoxy- 2-dimethylamino-benzthiazole dihydrochloride, monoethanolammonium-benzthiazole-2-thiol, laurylpyridinium-5-chloro-2-mercaptobenzthiazole, zinc and sodium salts of 2-mercaptobenzthiazole and dimethyldithiocarbamate, 6-(β-diethylaminoethoxy)-2-dimethylaminobenzthiazole dihydrochloride, 3-trichloromethylthiobenzothiazolone, 3-trichloromethylthiobenzoxazolone, 3-(trichloromethyl)-5-ethoxy-1,2,4-thiadiazole, 6-methyl-2-oxo-1,3-dithiolo[4,5-b]-quinoxaline (quinomethionate), 2-thio-1,3-dithiolo[4,5-b]-quinoxaline (thioquinox), 2,3-dihydro-5-carboxanilido-6-methyl-1,4-oxathine, 3,3,4,4-tetrachlorotetrahydrothiophene-1,1-dioxixide, and 2,3-dihydro-5-carboxanilido-6-methyl-1,4-oxanthine-4,4-dioxide;

Quaternary ammonium compounds cetyl-trimethylammonium bromide, n-alkyl($C_{12}$, $C_{14}$, $C_{16}$) dimethylbenzylammonium chloride, alkenyl-dimethylethylammonium bromide, dialkyldimethylammonium bromide, alkyldimethylbenzylammonium chloride, alkyl $C_9$–$C_{15}$tolylmethyltrimethylammonium chloride, di-isobutylcresoxyethyldimethylbenzylammonium chloride, para-di-isobutylphenoxyethoxyethyldimethylbenzylammonium chloride, and benzoyltrimethylammonium bromide;

Fungicidal antibiotics

Gliotoxin, 2,4-diguanidino-3,5,6-trihydroxycyclohexyl 5-deoxy-2-O-(2-deoxy-2-methylamino-α-L-glucopyranosyl)3-C-formyl-β-L-hyxopentanofuranoside (streptomycin), 7-chloro-4,6-dimethoxycoumaran-3-one-2-spiro-1'-(2'-methoxy-6'-methylcyclohex-2'-en-4'-one) (griseofulvin), 4-dimethylamino-1,4,4α,5,5α,6,11,12α-octahydro-3,5,6,10,12,12α-hexahydroxy-6-methyl-1,11-dioxo-2-naphthacenecarboximide (oxytetracycline), 7-chloro-4-dimethylamino-1,4,4α,5,5α,6,11,12α-octahydro-3,6,10,12,12α-pentahydroxy- 6-methyl-1,11-dioxo-2-naphthacenecarboximide (chlorotetracycline), (pimaricin), (lancomycin), (phleomycin), (kasugamycin), (phytoactin), D(-)-threo-2,2-dichloro-N- [β-hydroxy-α-(hydroxymethyl)-para-nitrophenethyl-]aretamide (chloramphenicol), and blasticidine-S-benzylaminobenzenesulphonate;

Miscellaneous substances

N-(3-nitrophenyl)itaconimide, phenoxyacetic acid, sodium para-dimethylaminobenzendiazosulphonate, acroleinephenylhydrazone, 2-chloracetaldehyde(2,4-dinitrophenyl)-hydrazone, 2-chloro-3-(tolylsulphonyl)-propionitrile, 1-chloro-2-phenylpentanediol(4,5)-thione(3), para-nonylphenoxypolyethyleneoxyethanol-iodine complex, (α-nitromethyl)-orthochlorobenzylthioethylamine hydrochloride, 3-(para-tert.-butylphenylsulphonyl)acrylonitrile, -butylphenylsulphonyl)acrylonitrily, octachlorocyclohexanone, pentachlorobenzyl alcohol, pentachlorobenzyl acetate, pentachlorobenzaldehyde cyanohydrin, 2-norcamphanemethanol, 2,6-bis-(dimethylaminomethyl)-cyclohexanone, decachloro-octahydro-1,3,4-methano-2H-cyclobuta[cd]-pentalen-2-one, 1-(3-chloroallyl)-3,5,7-triaza-1-azoiaadamantane chloride, coal tar, and blast furnace tar;

Mixtures nickel sulphate/maneb mixture, maneb/mercaptobenzthiazole mixture, zineb/mercaptobenzthiazole mixture, zineb/nickel (II) chloride mixture, zineb/nickel(II)sulphate mixture, ziram/basic copper sulphate mixture, ziram/zinc/mercaptobenzthiazole mixture, thiram/cadmium hydrochloride mixture, thiram/hydroxymercury chlorophenol mixture, thiram/phenylmercury acetate mixture, polyethylene/bis-thiouram sulphide/copper oxychloride mixture, methylarsine/bis-(dimethyldithiocarbamate)/ziram/thiram mixture, folpet/phenylmercury acetate mixture, dodine/ferbam/sulphur mixture, diethianone/copper oxychloride mixture, dichlone/ferbam/sulphur mixture, dinocap/dinitrooctylphenol mixture, captan/quintozene/tribasic copper sulphate mixture, cadmium propionate/phenylmercury propionate mixture, formaldehyde/urea mixture a phenylammonium cadmium dilactate/phenylmercury formamide mixture, and basic copper sulphate/zinc salts mixture.

For application purposes the compounds of formula are advantageously mixed together with suitable carriers and/or other adjuvants such, for example, as natural or regenerated mineral substances, solvents, dispersing agents, adhesives, thickeners, binders or fertilizers. Such additives are commonly used in the formulation technique of pesticides. Thus the active ingredients may be formulated to dusting agents, emulsion concentrates, granules, sprays, solutions or suspensions. Application may be effected, for example, by pouring, spraying, sprinkling, strewing, or dusting the preparation onto, or into, the soil, or by seed dressing.

The amount of compound of formula I present in the preparation may vary within a wide range, depending on the purpose for which it is to be used. The amount used is generally within the range of from 0.005 to 90% by weight, more especially within the range of from 0.005 to 0.5% by weight and preferably within the range of 0.01 to 0.1% by weight. The mixture of active substances is generally applied in an amount of from 50 to 2,000 grams per hectare. In some instances, however, it is possible, or sometimes even necessary, to operate at concentrations above or below these limits.

The preparation may be in the form of a solution, in particular with an alchol (for example, ethyl alcohol or isopropyl alcohol), alternatively, with a ketone (for example, acetone or cyclohexanone), an aliphatic hydrocarbon (for example, kerosene), a cyclic hydrocarbon (for example, benzene, toluene, xylene, or tetrahydronaphthalene) an alkylated naphthalene, a chlorinated hydrocarbon (for example, tetrachloroethane, ethylene chloride), or with a mineral or vegetable oil or with a mixture of any of the above-mentioned substances.

The preparation may be in the form of an aqueous dispersion, in which case the active substances may be homogenized in water, either per se or in one of the above mentioned solvents, preferably with the acid of a dispersing agent. A cationic dispersing agent (for example, a quaternary ammonium compound) an anionic dispersing agent (for example, a soap, an aliphatic long-chain sulphuric acid monoester, an aliphatic-aromatic sulphonic acid or a long-chain alkoxyacetic acid) or a non-ionic dispersing agent (for example, a polygycol ether of a fatty alcohol or alkylphenol or ethylene oxide) may be used.

The preparation may also be in the form of a concentrate comprising the active substance, a dispersing agent, and, if necessary, a solvent. Prior to use, such a concentrate is diluted, for example, with water, whereupon it becomes an emulsion or suspension, in which form it may be used.

Alternatively the preparation may be in the form of a dusting agent which may be prepared by mixing or grinding the active substance with a solid carrier. Examples of suitable carriers are: talcum, diatomaceous earth, kaolin, bentonite, calcium carbonate, boric acid, tricalcium phosphate and also wood meal, cork meal, charcoal and other materials of vegetable origin. The active substance can also be applied to a carrier by means of a volatile solvent. A wettable powder or paste that can be suspended in water can be prepared by the addition of a wetting agent and/or a protective colloid to the active substance.

In many cases the use of granules is advantageous, for example when the uniform emission of active substance over a prolonged period of time is required. These can be prepared by dissolving the compound of general formula I in an organic solvent, allowing the solution to be absorbed by granulated material, for example, attapulgite or $SiO_2$, and then removing the solvent. Granules can also be prepared by mixing the compound of general formula I with a polymerizable compound, carrying out polymerization, which has no effect on the active substance, and carrying out granulation during the polymerization process. The amount of compound of general formula I present in such granules is normally between 0.1 and 95 % by weight, although concentrations of up to 99.5 %, or even pure active substance, can be used when spraying is effected from an aircraft or from some suitable apparatus.

EXAMPLE 1 a. 123.4 g of propargyl alcohol are stirred into 1200 ml of dimethylformamide. Then 89.3 g of pulverised sodium hydroxide are added in small portions at a temperature of from 10 to 15°C whereupon, in the same temperature range, 451 g of 3-nitro- 4-chloro-trifluorotoluene are added drop by drop within 30 minutes. Stirring is continued for 17 hours at 15° to 20°C, then the reaction mixture poured into 4 litres of water which latter is then extracted with ether. 429 g of a yellowish red oil having a boiling point of 115°–117°C/0.5 Torr. b. 171.5 g of the above prepared 2-nitro-4-trifluoromethylphenyl propargyl ether are dissolved in 3000 ml of methanol. At a temperature of from 10° to 20°C 560 ml of a 10% sodium hydroxide solution and 196 q of iodine are added simutaneously but separately in small portions. Stirring is continued for 3½ hours at room temperature whereupon the reaction mixture is poured into 6 liters of water. The crystalline 2-nitro-4-trifluoromethyl-phenyl-iodopropargyl ether melts at 84°–86°C (compound No. 1). The following compounds were prepared analogously:

$$\underset{NO_2}{\overset{CF_3}{\bigcirc}}\text{—O—CH—C} \equiv \text{C—I}$$
$$R_1 \qquad R_2$$

| | $CF_3$ position | $NO_2$ position | $R_1$ / position | $R_2$ | Melting point |
|---|---|---|---|---|---|
| 2. | 2 | 4 | H | H | 96–98°C |
| 3. | 2 | 4 | H | $CH_3$ | 75–76°C |
| 4. | 4 | 2 | Cl/3 | H | 125–129°C |

EXAMPLE 2

Dusting agents

Equal parts of a mixture of a compound of formula I and precipitated silica are finely ground. Dusting agents is prepared therefrom by mixing mixture with kaolin or talcum; the preferred active principle content being 1 to 6%.

Wettable powder for preparation of sprays

A wettable powder is prepared by mixing, for example, the following components and then finely grinding the mixture:

50 parts of a compound of formula I
20 parts of highly adsorptive silica 25 parts of *Bolus alba* (kaolin)
1.5 parts of sodium 1-benzyl-2-starylbenzimidazole 6,3'-disulphonate
3.5 parts of a reaction product derived from para-tert. octylphenol and ethylene oxide.

Emulsion concentrate

The readily soluble compound of formula I is formulated as an emulsion concentrate according to the following procedure:

A mixture is prepared from 20 parts of a compound of formula I 70 parts of xylene 10 parts of a mixture of a reaction product derived from an alkylphenol and ethylene oxide and calcium dodecylbenzenesulphonate.

An emulsion capable of being used as a spray is formed when the mixture is diluted with water to the desired concentration.

Granules 7.5 Grams of a mixture of compound of formula I and synergist are dissolved in 100 ml of acetone and the solution so obtained is applied to 92 grams of granulated attapulgite. The mixture is thoroughly mixed and the solvent is removed in a rotary evaporator. Granules containing 7.5% of compound of formula I are obtained.

EXAMPLE 3

A mixture of equal parts of silica sand and alumina was inoculated with a mycelium suspension of *Pythium splendens Braun*. The mixture was then put into pots and the pots placed in a greenhouse compartment. After 2 days, the pots were sown with cucumber seeds and then an aqueous liquor containing the active principle under test was poured evenly over the pots. The pots were kept at a suitable degree of dampness and the percentage of healthy seedlings was determined after 14 days. The following results were obtained in respects of compounds 1 to 4:

| Compound No. | Concentration in kg compound per hectare | Efficacy in % |
|---|---|---|
| 1 | 30 | 90 |
| 2 | 30 | 95 |
| 3 | 30 | 95 |
| 4 | 30 | 95 |

EXAMPLE 4

A mixture of equal parts of silica sand and alumina was inoculated with an aqueous conidium suspension of Fusarium oxyanorum Schl. The mixture was then put into pots and the pots placed in a greenhouse compartment. After 2 days, the pots were sown with melon seeds and then an aqueous liquor containing the active principle under test was poured evenly over the pots.

The pots were kept at a suitable degree of dampness and the percentage of healthy seedlings was determined after 14 days.

| Compound No. | Concentration in kg compound per hectare | Efficacy in % |
|---|---|---|
| 1 | 30 | 90 |
| 2 | 30 | 95 |
| 3 | 30 | 95 |
| 4 | 30 | 100 |

We claim:

1. A fungicidal composition for application to the sail comprising a fungicidally active amount of the compound of the formula

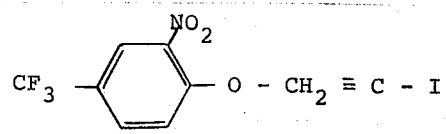

and a suitable carrier.

2. A method for combating soil fungi which comprises applying thereto a fungicidally effective amount of the compound of the formula

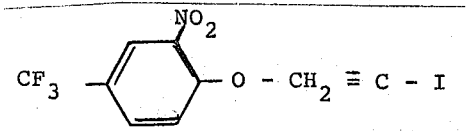

* * * * *